(12) United States Patent
Hinde

(10) Patent No.: US 10,498,848 B2
(45) Date of Patent: Dec. 3, 2019

(54) PROXY NODE FOR TRANSFERRING PACKETS BETWEEN A SERVER AND A CLIENT USING PORT SHARDING

(71) Applicant: SANDVINE CORPORATION, Vancouver (CA)

(72) Inventor: Sean Hinde, Christchurch Dorset (GB)

(73) Assignee: SANDVINE CORPORATION, Vancouver (CA)

( * ) Notice: Subject to any disclaimer, the term of this patent is extended or adjusted under 35 U.S.C. 154(b) by 85 days.

(21) Appl. No.: 15/318,478

(22) PCT Filed: Jun. 13, 2014

(86) PCT No.: PCT/EP2014/062446
§ 371 (c)(1),
(2) Date: Dec. 13, 2016

(87) PCT Pub. No.: WO2015/188884
PCT Pub. Date: Dec. 17, 2015

(65) Prior Publication Data
US 2017/0142216 A1 May 18, 2017

(51) Int. Cl.
*H04L 29/08* (2006.01)
*H04L 29/06* (2006.01)
*H04L 12/801* (2013.01)
*H04L 12/851* (2013.01)

(52) U.S. Cl.
CPC .......... *H04L 67/2814* (2013.01); *H04L 47/11* (2013.01); *H04L 47/12* (2013.01); *H04L 47/24* (2013.01); *H04L 67/02* (2013.01); *H04L 67/2819* (2013.01); *H04L 67/42* (2013.01); *H04L 69/163* (2013.01)

(58) Field of Classification Search
None
See application file for complete search history.

(56) References Cited

U.S. PATENT DOCUMENTS

| | | |
|---|---|---|
| 7,398,314 B2 | 7/2008 | Bar-Yaacov et al. |
| 7,836,191 B2 | 11/2010 | Susai et al. |
| 2004/0243835 A1* | 12/2004 | Terzis ................ G06F 21/6218 726/3 |

(Continued)

FOREIGN PATENT DOCUMENTS

EP    1011244 A2    6/2000

OTHER PUBLICATIONS

International Search Report dated Feb. 9, 2015, in International Patent Application No. PCT/EP2014/062446, filed Jun. 13, 2014, 3 pages.

*Primary Examiner* — Chi H Pham
*Assistant Examiner* — Raul Rivas
(74) *Attorney, Agent, or Firm* — Davis Wright Tremaine LLP

(57) ABSTRACT

The present disclosure relates to a proxy node 30, a method and a computer program in a proxy node in an IP network for transferring TCP packets between a server 40 and a client 20. The disclosure comprises modifying the port number of the server of at least one object so as to create the appearance that the at least one object, which resides on the same server, is residing on a different server, and causing the client 20 to open an additional TCP connection for the at least one object, whereby the speed of downloading web content can be accelerated.

11 Claims, 6 Drawing Sheets

(56) References Cited

U.S. PATENT DOCUMENTS

2008/0313348 A1* 12/2008 Morris ................ H04L 9/0841
709/239
2013/0238759 A1 9/2013 Ostrowski

* cited by examiner

PROXY NODE FOR TRANSFERRING PACKETS BETWEEN A SERVER AND A CLIENT USING PORT SHARDING

TECHNICAL FIELD

The present disclosure relates to a method and proxy node for transferring packets between a server and a client in an IP network, wherein port sharding is used when transferring packets.

BACKGROUND ART

According to forecasts recently published by Cisco Visual Networking Index, global IP traffic has increased more than fourfold in the past few years, and will continue to increase over the coming years. Overall, IP traffic will grow at a compound annual growth rate of about 25 percent from 2012 to 2017. Busy hour Internet traffic is growing more rapidly than average Internet traffic. Busy hour Internet traffic will in 2017 reach the equivalent of 720 million people streaming a high-definition video continuously. It is needless to say that the demands on communication infrastructure will be increasing during a foreseeable time period.

The number of devices connected to IP networks will be nearly three times as high as the global population in 2017. Also the IP traffic per capita will be increased by about three times in 2017 compared with 2012 and more particularly, the IP traffic is expected to reach to 16 gigabytes per capita in 2017 compared with 6 gigabytes per capita in 2012. The IP traffic will be accelerated in part by the increase in the number of devices and by continually introduced new and advanced functionality. This new functionality will often require substantial amounts of data to be transferred.

It is clear from the above that all applicable quantitative numbers related to the mobile broadband traffic globally are growing significantly every year. No real evidence that indicate a slowdown of this trend is yet to be seen in the market. However, it is conceivable that lack of sufficient server resources may in future reduce or at least during certain periods in time limit the speed of further growth and development. Server capacity for managing the growing demands for distributing the increasing amounts of information to be distributed over the Internet is therefore on its way to becoming a bottleneck.

A problem related to management of rapidly growing volumes of data traffic, is the management of increasing end user bandwidth with the introduction new technologies, such as HSPA+ (Evolved High-Speed Packet Access) and LTE (Long Term Evolution) technologies.

When opening a complex web page containing multiple resources, such as high resolution images, from the same web server domain name, web browsers are allowed to open a small and limited number of TCP/IP connections towards that server. This number has a maximum of typically four or six connections depending on the type and version of browser used. All of the resources from that domain are to be downloaded using this pool of opened TCP/IP connections. Often in a large and complex web page there can be 70 or more images, so the process of downloading all of the images requires ten or more request response pairs, each one utilizing an additional round trip to the server for each so-called HTTP (Hypertext Transfer Protocol) GET request. A consequence of that traffic is that the downloading process is perceived as disturbingly slow, especially by an experienced and/or professional user. The time delay in a web browser as experienced by a user, i.e. the latency of the computer system, is therefore an important parameter to improve. A part of the latency is also dependent on the physical distance to the content source.

Modern fixed as well as mobile networks usually have more than enough bandwidth to download many more resources in parallel than is possible, due to the mentioned constraints related to rules of the particular communication protocol used. This is true also when considering that resources requests can be serialized. Therefore, congestion problems in networks that are associated with downloading of web content, problems that used to be mainly related to restrictions in available bandwidth, are no longer the main concern. The real problem has moved from being related to the actual transfer of data to instead being mainly related to latency effects in the system.

Numerous approaches have been tried over the years to minimise the effects of latency. One of the approaches is to accelerate load times of web page content in that the website provider distributes resources that constitute the web page across multiple web servers on different domains. This causes the browser to open more simultaneous connections than normally allowed. Resources that would normally be downloaded on a single domain are allowed to be split and can then simultaneously be downloaded across multiple domains. This is called domain sharding. This approach potentially allows many more resources to be downloaded in parallel, and reduces the overall load time of the content of a web page. Similar domain sharding methods of accelerating downloading of web page content are widely used, and enable web browsers to make better use of high-bandwidth internet connections in computer systems of today.

A prior art method related to domain sharding is published in U.S. Pat. No. 7,398,314, which discloses a technique for downloading multiple objects from at least one server in an accelerated manner. A so-called spoofer is utilized to intercept traffic between a server and a client, which traffic is modified so that it appears as though objects from a single server are actually being sourced from multiple servers. This allows for parallel download of objects and thus also allows for a reduction of the amount of time necessary to download the objects, as the relative negotiation time is reduced.

From a more technical perspective, previous approaches are based on rewriting a portion of the host name in the HTML (Hypertext Markup Language) to a local IP address on the proxy node system. This rewriting process is then either served from a cache memory or retrieved from an originally used resource in an alternative manner. As an alternative to the processes described, a domain name server (DNS) could be used so as to make additional sub domains appear.

However, all the mentioned previous attempts and approaches to use domain sharding suffer from a number of limitations. One of the limitations is that the browser uses domain name restrictions in cookies to place restrictions on content that originate from a domain that is not listed in the cookie. To mention only one of several disadvantages of such a method, it could adversely affect for example recognition of individual subscribers in subscription services. Such subscription services oftentimes rely on host name-based mechanisms for restricting content, and a problem of recognition occurs when the modified host name does not any longer match information contained in a corresponding cookie.

SUMMARY OF THE INVENTION

It is an object of the present invention to mitigate, alleviate or eliminate some of the disadvantages of above-mentioned previous attempts to speed up the time of downloading information available on the internet. In particular, the present invention aims at using added functionality to reduce the time it takes for a browser to download complex content from a web server to a client, such as large web sites with many images.

This object is achieved by means of a proxy node, a method and a computer program in a proxy node for transferring TCP/IP packets between a server and a client in an IP network, the proxy node being arranged in between the server and the client, wherein the method comprises the steps of:

initiating connection between the client and the server using a three-way TCP handshake protocol for establishing connection, the client using the established connection for requesting information from the server by transferring an HTTP/GET request, the proxy node capturing HTML response packets on their way being transferred from the server to the client, the proxy node inspecting the content of HTML tags for each captured response packet of a type generally known to incorporate HTML data, for each HTML tag that includes a URL pointing to either external content or content hosted directly on the origin server, counting the number of instances of each server hostname of the resource pointed to by the HTML tag and incrementing by one for each instance, when the counting for a server exceeds a predetermined threshold value, modifying the port number of the host part of the URL in the HTML tag to append a non-standard port number and adding a prefix to the path part of the URL to indicate in the subsequent request that this URL has been subject to re-direction of the URL, upon a client request to a modified port number of the HTML tag, intercepting the request and redirecting it to a standard port number, removing the added prefix, checking that the part of the prefix relating to the port number of the HTML tag matches the port number of the TCP/SYN packet.

An advantage of the present disclosure is that the cookie mechanism of the web browser only looks at the hostname part of the domain and not the port number part of the domain, whereby previously mentioned problems associated with subscription services that rely on hostname-based mechanisms for restricting content, can be eliminated, since no mismatching of different sets of modified subscriber related data will be occurring.

According one embodiment of the present disclosure, as soon as the client web browser has exceeded a predetermined threshold value, it is caused to open an additional concurrent TCP/IP connection beyond the number of open TCP/IP connections recommended under the applicable communication protocol. This protocol typically is an HTTP protocol. A benefit of this is that the number of ports can exceed the standardised limitation of four or six simultaneously open ports, by which the time for downloading complex content can be substantially reduced.

In accordance with another embodiment of the disclosure, the proxy node is adapted to detect port numbers that are almost never used and assigning these port numbers to connections to be made. This is advantageous as a means to avoid conflicts between the modified port number and servers that happen to use the modified port number for other purposes.

One embodiment of the disclosure includes that the port number is modified by indicating a non-standard port number as yet unassigned by the port number assignment authority, Internet Assigned Numbers Authority, IANA. Moreover, the proxy node is capable of excluding port numbers that have a real use on the server from being indicated as non-standard port numbers. This reduces the risk for assigning connections to ports that are already in operation.

Another embodiment discloses that the resource URL (Uniform Resource Locator) is modified so as to indicate that re-direction is needed. It also enables that modification of the port number of at least one object includes attaching a priority marker in the URL. This indicates to the proxy node that it was correct to re-direct the TCP/SYN packet to the standard port number. Thus, the absence of the URL modification is used in the request as a trigger to store the server address and port in a blacklist table so that future rewriting of HTML content from the same server will avoid using that particular port number in its set of sharding ports.

Other objects, features, and advantages of the present invention will become apparent upon reading the following detailed description of the embodiments with the accompanying drawings and appended claims.

BRIEF DESCRIPTION OF THE DRAWINGS

Referring now to the drawings, in which like numerals refer to like parts throughout the several views, exemplary embodiments of the present invention are described.

FIG. 2 represents a signalling chart sequentially illustrating signalling between a server 40 and a client 20, whereby a proxy node 30 is placed in between.

FIG. 3 represents a signalling chart sequentially illustrating signalling between a server 40 and a client 20, whereby a terminating proxy node 30 is placed in between.

FIG. 4 represents a signalling chart sequentially illustrating signalling between a server 40 and a client 20, whereby a transparent TCP proxy node 30 is placed in between.

DETAILED DESCRIPTION

Figure 1:
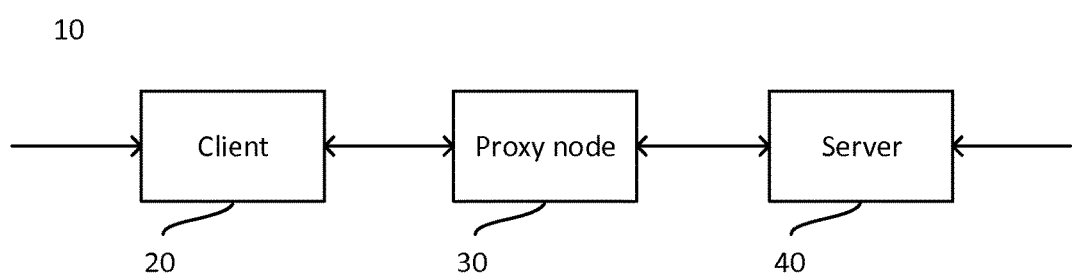
FIG. 1 illustrates a schematic network configuration of a server 40 and a client 20 including the proxy node 30 in-between the two.

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

The present disclosure relates to the object of improving throughput from a server or source node to a client or destination node in an IP network. The client may be a wireless device in an IP network, communicating with numerous servers in the network. Embodiments of the present disclosure relate, in general, to the field of TCP/IP packets. However, it must be understood that the same principles are applicable for other types of packets, e.g. encapsulated packets in a communications network.

As an alternative the present invention could be implemented in a standard terminating TCP/IP proxy node, which maintains a standalone socket between the client 20 and the proxy node 30 and collects data from the server 40 through one or more new sockets initiated from the proxy node 30 towards the server 40.

Transmission Control Protocol/Internet Protocol (TCP/IP) is the most dominant protocol used for distributing information in computer networking and on the Internet. TCP/IP is a connection-oriented protocol, where devices at the end points, so-called nodes, establish a connection before any data is sent. A TCP/IP connection contains three phases: connection establishment, data transfer and connection termination. For simplicity, the nodes will herein be denoted server and client.

A proxy node 30 according to the present disclosure is a server 40, a computer system or an application that acts as an intermediary for requests from clients seeking resources from other servers. A client 20 connects to the proxy node 30, requesting some service, such as a file, connection, web page, or other resource available from a different server and the proxy node 30 evaluates the request as a way to simplify and control its complexity. Proxy servers or proxy nodes were originally introduced to add structure and encapsulation to distributed systems. Today, most proxy nodes are so called web proxies, facilitating access to content on the Internet. Another use of proxy nodes is that they may provide anonymity for the user when required, although there are more or less sophisticated ways of countering this anonymity when being misused.

In the connection establishment phase, or call set-up phase, control data is passed between the node 30s to establish a connection. The TCP/IP protocol uses a three-way handshake protocol to synchronize and to establish the connection between the server 40 and the client 20. The connection is initiated by a destination node, which herein will be denoted the client 20, sending a TCP/SYN packet to the source node, which herein will be denoted the server 40. The server 40 acknowledges the session initiation by returning a so-called TCP/SYN-ACK packet, and the client 20 acknowledges this by returning a so-called TCP/ACK packet. During this three-way handshake the hosts negotiate the connection settings. After the three-way handshake protocol, both ends, i.e. both the client and the server sides, become equal peers that act both as sources and destinations.

Once the connection is established, the speed of the data transmission is controlled by three factors: The first factor is the rate at which the server 40 is willing to send data, controlled by a congestion control algorithm. The second factor is the TCP/IP window space advertised by the client 20 and the rate at which data appears to be getting delivered to the client 20, as determined by the TCP/ACK packets received at the server 40 from the client 20. The third and last factor is largely determined by the round trip time, RTT, of the connection.

Performance enhancing proxies (PEPs) are network nodes inserted in the middle of the connection, which try to improve the performance of the connection by taking over a part of the TCP/IP connection. A proxy node can for example be adapted to speed up the connection by reducing the apparent round trip time, negotiate a better set of TCP/IP options on behalf of the end points, or react faster to any anomalies in the connection, like packet loss, and if possible correct them.

The first TCP/IP packets containing user data from the client 20 towards one of the designated sharding port numbers are intercepted by the proxy node 30 and the TCP/IP packet is inspected to determine whether it is a valid HTTP/GET request. Its URL is examined for the presence of a special prefix indicating that it should have been a diverted connection. If the special prefix is present and the associated TCP/IP socket had been diverted to the special port, the special prefix is removed and the request sent to the server 40 on port number 80.

If the prefix is not present for a diverted connection, or the data does not constitute a valid HTTP/GET request this suggests the TCP/SYN packet was diverted in error. Then the server 40 and the port number are blacklisted from further use by the proxy node system. Future TCP/SYN packet requests to that host and port number would not be diverted to port number 80. The consequence is that one connection to a little used port has failed, but on the other hand that future requests would be handled correctly.

The described mechanism of blacklisting may not be required in an alternative embodiment using a terminating proxy node 30, since the HTTP/GET request could be received by the proxy node 30 before the need to send a TCP/SYN packet to the server 40.

An alternative option is to keep a list sorted by the rate of occurrence of the top URL's, such as the 10 000 most frequently used URL's, for which no optimisation has been performed. This would then imply utilisation of a substantial timeout on those URL's with low counts, i.e. below a certain threshold value, while letting URL's with high counts, i.e. above a certain threshold value, be delivered without delay. Large content could also be prioritised by having the timeout depend on resource size.

Yet another alternative embodiment of the present invention could be to keep a list of URL's, the URL's sorted by the potential number of port sharding possibilities in the content. A consequence of using the mentioned list would then be not even to attempt port sharding if no suitable embedded links exist in the HTML.

FIG. 1 schematically illustrates an IP network 10. The network 10 comprises a server 40 and a client 20, e.g. a wireless device in a wireless access network to give one example. The network further comprises a proxy node 30 arranged between the server 40 and the client 20 in the network 10.

Figure 2:
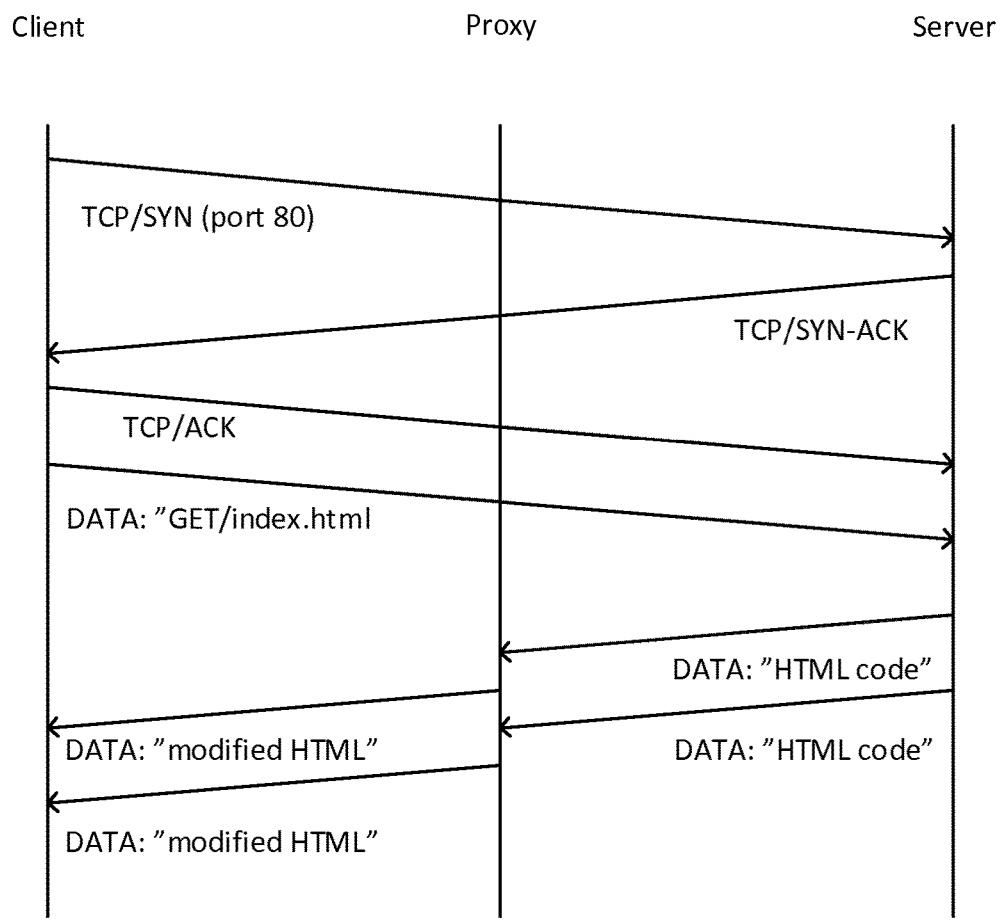

FIG. 2 represents a signalling chart sequentially illustrating signalling between a server 40 and a client 20, whereby a functional proxy node 30 is placed in between.

In FIG. 2, connection is initiated between the client 20 and the server 40 using a three-way TCP handshake protocol for establishing connection. The client 20 then uses the established connection for requesting information from the server 40 by transferring an HTTP/GET request. The proxy node 30 continuously captures HMTL response packets on their way being transferred from the server 40 to the client 20 so as to enable inspection of the content of HTML tags for each captured response packet of a type generally known to incorporate HTML data. For each HTML tag that includes a URL pointing to either external content or content hosted directly on the origin server 40, the number of instances of each server 40 hostname is counted incrementing by one for each instance. As has been briefly mentioned, as soon as the counting for a server 40 exceeds a predetermined threshold, the port number of the host part of the URL in the HTML tag is modified to append a non-standard port number and a prefix is added to the path part of the URL to indicate in the subsequent request that this URL has been subject to re-direction.

Upon a client request to a modified port number of the HTML tag, the request is intercepted and redirected to a standard port number, whereby the added prefix is removed. In the next step it is checked that the part of the prefix relating to the port number of the HTML tag matches the port number of the TCP/SYN packet, and if no match is found, the connection is rejected and this port number is excluded from being used in future requests to the same server address.

Figure 3:
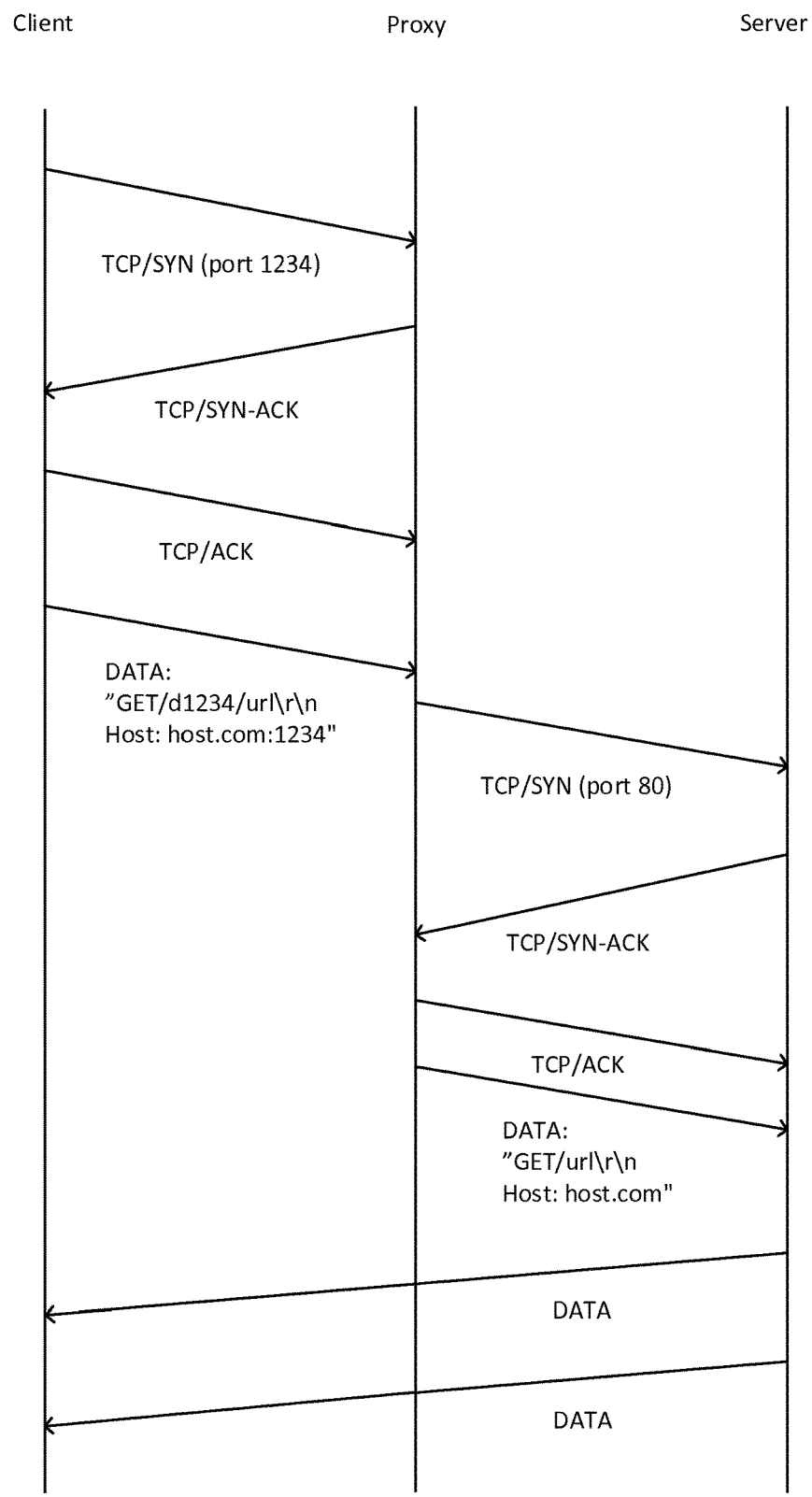

FIG. 3 represents a signalling chart sequentially illustrating signalling between a server 40 and a client 20, whereby a terminating proxy node 30 is placed in between.

Referring to FIG. 3, connection is initiated between the client 20 and the server 40, in a different way compared to FIG. 2, involving the terminating proxy node 30 which is listening on port number 80 and port number 1234 respectively. The terminating proxy terminates signalling from the client 20 on port number 1234 before it reaches the server 40. As mentioned, the content of HTML tags is inspected by the terminating proxy node 30 for each captured response packet of a type generally known to incorporate HTML data. For each HTML tag that includes a URL pointing to either external content or content hosted directly on the origin server 40, the number of instances of each server 40 hostname is counted incrementing by one for each instance. As soon as the counting for a server 40 exceeds a predetermined threshold, the port number of the host part of the URL in the HTML tag is modified to append a non-standard port number and a prefix is added to the path part of the URL to indicate in the subsequent request that this URL has been subject to re-direction.

Figure 4:
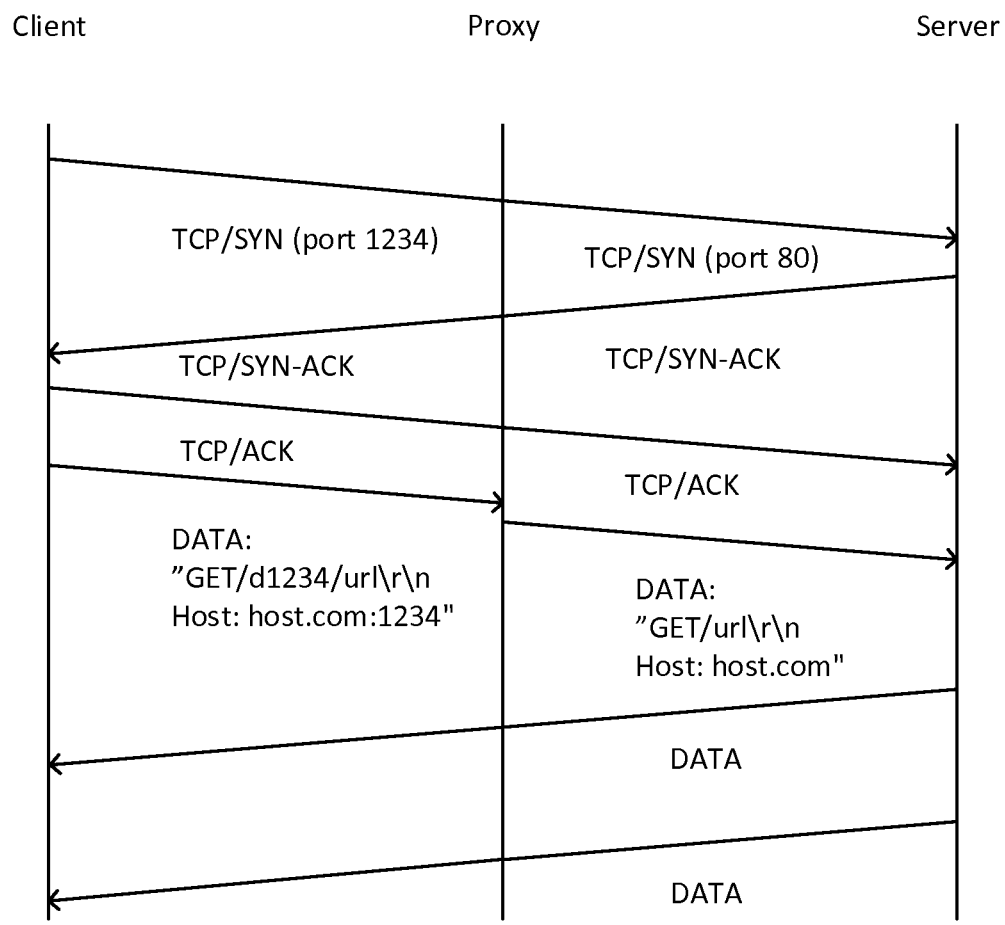

FIG. 4 represents a signalling chart sequentially illustrating signalling between a server 40 and a client 20, whereby a transparent TCP proxy node 30 is placed in between.

With particular reference to the signalling chart of FIG. 4, connection is initiated between the client 20 and the server 40 using a three-way TCP handshake protocol for establishing connection in a similar way as in FIG. 2. In case the transparent proxy node 30, when inspecting TCP/SYN packets, discovers that they are directed towards a port number that is infrequently used (such as in this particular case port number 1234), i.e. below the mentioned threshold, the proxy node 30 immediately redirects the TCP/SYN packet to port number 80. The following signalling from the client 20 is then redirected from port number 1234 to port number 80 when passing the transparent proxy node 30.

Figure 5:
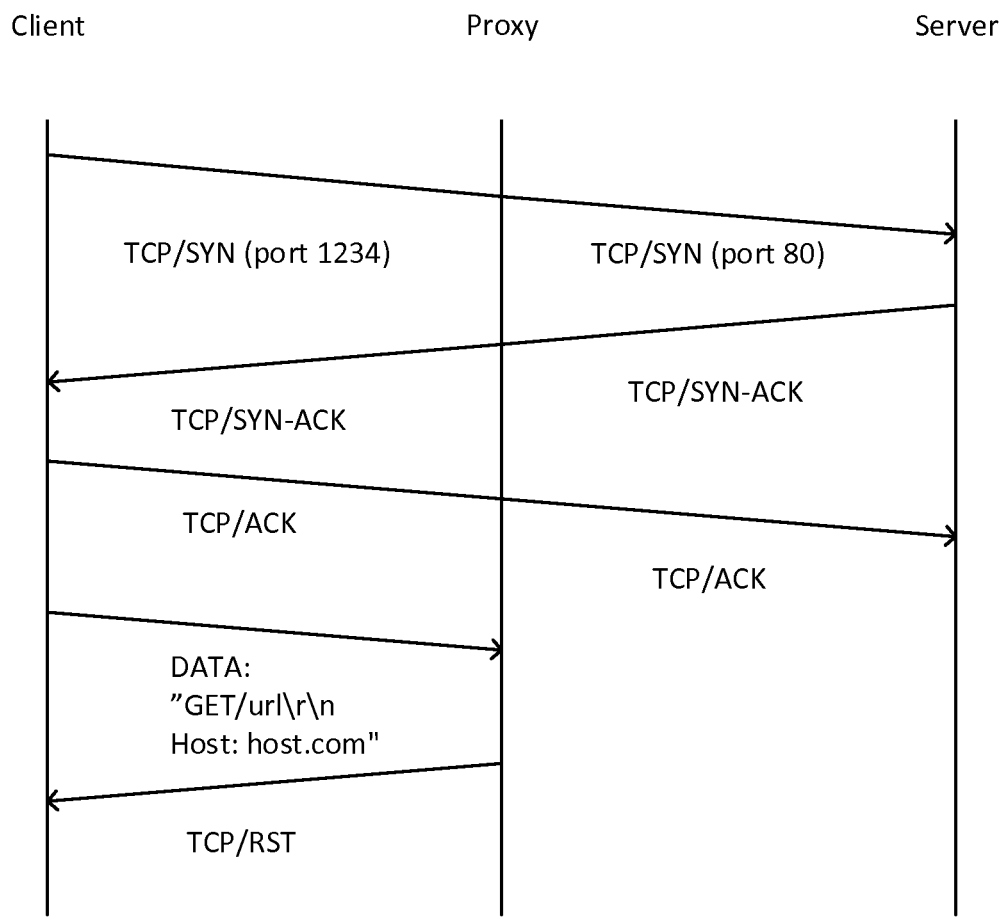
FIG. 5 represents a signalling chart sequentially illustrating signalling between a server 40 and a client 20, whereby the transparent TCP proxy node 30 does not allow data through to the server 40, due to the lack of a correct prefix.

FIG. 5 represents a signalling chart sequentially illustrating signalling between a server 40 and a client 20, whereby the transparent TCP proxy node 30 does not allow data through to the server 40, due to the lack of a correct prefix.

Referring to FIG. 5, connection is initiated between the client 20 and the server 40 in the way described with reference to FIG. 4. That means that connection is initiated between the client 20 and the server 40 using a three-way TCP handshake protocol. The transparent proxy node 30 inspects TCP/SYN packets which use a port number (in this case port number 1234) that is infrequently used, i.e. below the mentioned threshold and immediately redirects the TCP/SYN packet to port number 80. Signalling from the client 20, subsequent to the initiation of connection, is then redirected from port number 1234 to port number 80 when passing the transparent proxy node 30. When an HTTP/GET request is captured by the transparent proxy node 30 and lacks the necessary prefix for redirection, it is sent back to the client 20 and thus never reaches the server 40. The IP address of that particular server 40 is then marked, and its address and port number will remain unaltered in future signalling. As previously mentioned, this operation is designated the blacklisting.

Throughout the specification and appended claims, HTML is referred to as an exemplary language, but someone who is skilled in the art can appreciate that the invention can be used for other types of mark-up languages, such as XML (Extensible Markup Language), DHTML (Dynamic HTML) etc.

Even though the present disclosure mainly is concentrating on high speed networks, in which latency becomes essential to avoid, there are still very low bandwidth networks in use around the world. In these networks the web browser opening even six connections in parallel towards each web server will be enough to completely fill the network bandwidth and cause the web page to reach a useable status more slowly. This would typically be seen as several large images gradually loading while other major elements of the page are still not visible. A further enhancement to the present invention could be to place a priority in the inserted prefix in the HTML tag to indicate to the proxy node 30 the speed and order in which each sharded component of the web page should be sent by the proxy node 30 to the client 20. This priority could simply be a number indicating the order in which the elements appear in the page, or alternatively based on resource type. An example of this could be to give higher priority for Java scripts and CSS (Cascading Style Sheets) resources, while giving lower priority for images.

The speed and order of sending content could be determined statically by configuration, or dynamically based on current network conditions. These network conditions would then be based on measurement of the speed at which earlier page elements were delivered to the client 20 or otherwise measured congestion level, the level derived from packet loss or round trip time measurements.

Figure 6:
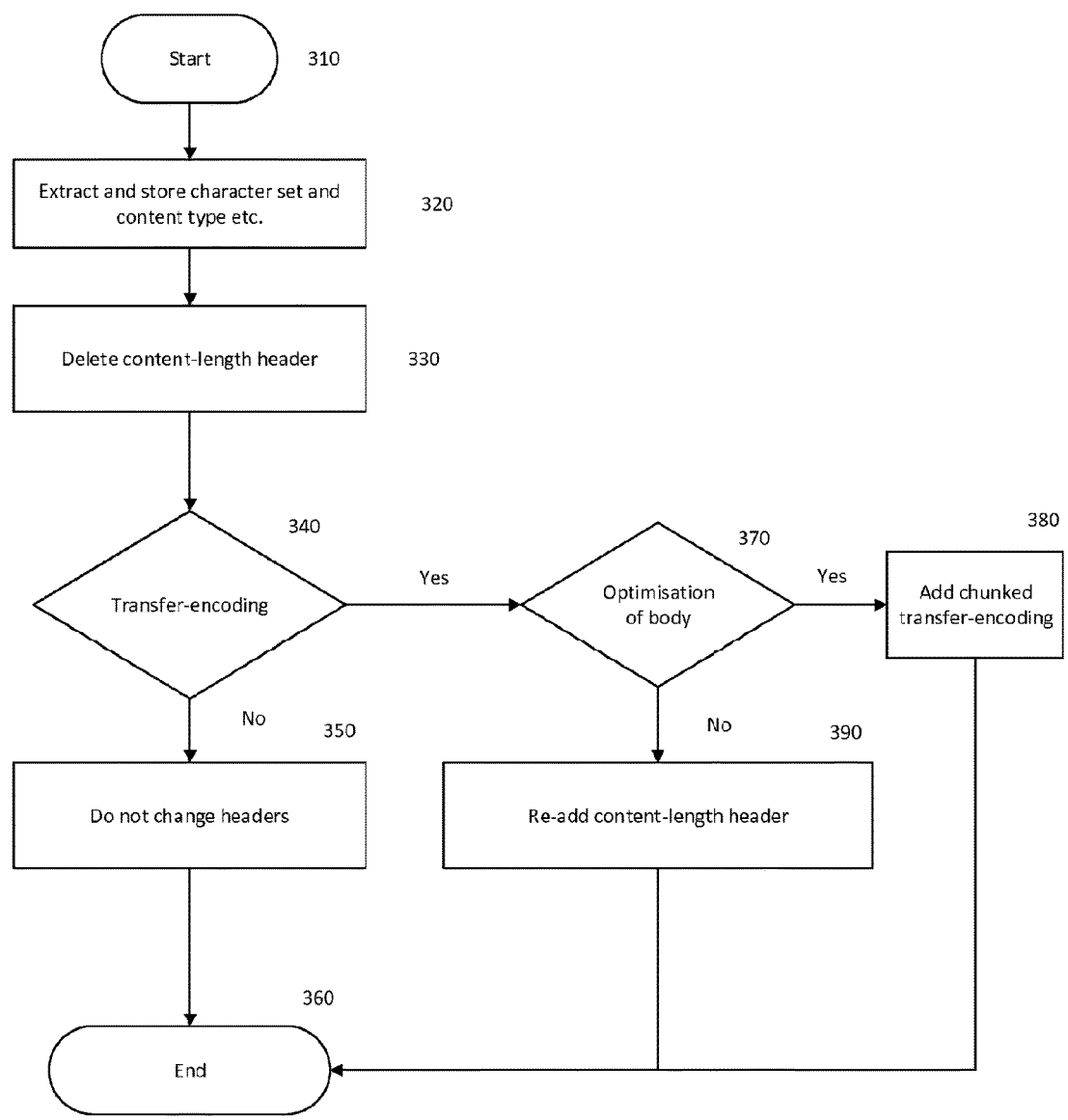
FIG. 6 illustrates in a flowchart various aspects of a method in a proxy node 30 for transferring packets between a server 40 and a client 20 using port sharding.

FIG. 6 illustrates in a flowchart aspects of a method in a proxy node 30 for transferring packets between a server 40 and a client 20 using port sharding. A particular aspect of the present invention relates to the processing of header information. To determine whether to modify the HTML body, the proxy node 30 examines both the HTTP request and the response headers. Modification of the HTML content requires use of so-called chunked encoding. Chunked encoding is dependent on the client 20 having first sent an accept-encoding, which is chunked in its request header.

In order to be able to use chunked encoding, where data is not already chunked, the proxy node 30 has to remove or delete any present content-length header and exchange that header with an added header, herein called transfer-encoding: chunked. The processing steps for making that exchange of headers starts step 310 with the extraction and storing of character set and content type from the content-type header and the content of the transfer-encoding, content-encoding and content-length headers step 320. In a next step 330, the content-length header is deleted. This deletion is due to the fact that the content-length header may be in an earlier packet than other important header fields, why the proxy node 30 must always delete the header if found.

After that, the process continues at the end of the headers by: in case of a transfer-encoding no modification is made of the headers step 350, besides the previously made deletion of content-length header. In case the proxy node 30 is to optimise the body step 370 and no transfer-encoding is applicable: a transfer-encoding header is added step 380. However, in case the proxy node 30 is not to optimise the body and the content length header is deleted, then the content header needs to be added again step 390. Having gone through this sequence of steps, the process is terminated in step 360.

Another aspect of a proxy node embodiment relates to a computer program comprising computer program code that causes the proxy node 30 to execute said method when run in the proxy node 30.

The invention claimed is:

1. A method in a proxy node for transferring TCP/IP packets between a server and a client in an IP network, the proxy node being arranged in between the server and the client, wherein the method comprises:
    initiating connection between the client and the server using a three-way TCP handshake protocol for establishing connection;
    the client using the established connection for requesting information from the server by transferring an HTTP/GET request;
    the proxy node capturing HTML response packets on their way being transferred from the server to the client;
    the proxy node inspecting the content of HTML tags for each captured response packet of a type generally known to incorporate HTML data;
    for each HTML tag that includes a URL pointing to either external content or content hosted directly on the origin server:
        counting the number of instances of each server hostname of the resource pointed to by the HTML tag and incrementing by one for each instance, when the counting for a server exceeds a predetermined threshold value, modifying the port number of the host part of the URL in the HTML tag to append a non-standard port number and adding a prefix to the path part of the URL to indicate in the subsequent request that this URL has been subject to re-direction of the URL;
    upon a client request to a modified port number of the HTML tag, intercepting the request and redirecting it to a standard port number:
        prioritizing the client request, wherein the prioritization is based on the prevailing network conditions as measured by either the speed earlier page elements were delivered to the client or based on packet loss or measured delay indicative of congestion;
        removing the added prefix; and
        checking that the part of the prefix relating to the port number of the HTML tag matches the port number of the TCP/SYN packet.

2. A method in a proxy node according to claim 1, wherein:
    if the prefix relating to the port number of the HTML tag does not match the and the port number of the TCP/SYN packet, rejecting the connection and excluding this port number from being used in future requests to the same server address.

3. A method in a proxy node according to claim 1, wherein the three-way TCP handshake protocol comprises a TCP/SYN packet initially being transferred from the client to the server, which server responds by transferring a TCP/SYN-ACK packet back to the client, which in turn follows up by transferring a TCP/ACK packet back to the server, whereby a new connection is established.

4. A method in a proxy node according to claim 1, wherein the three-way TCP handshake protocol is conducted when initiating the connection between the client and the server, and after that only upon said client request to a modified port number of the HTML tag.

5. A method in a proxy node according to claim 1, wherein the HTML tag includes a URL pointing to external content, such as img tags that point to pictures (<img src=http://"external-domain/path">) or tags that point to script files (<link type="script name">).

6. A method in a proxy node according to claim 1, wherein, the HTML tag includes a URL pointing to additional resources hosted on the same server as the HTML content (/path).

7. A method according to claim 1, wherein the prioritization is further based on occurrence of a particular URL prefix in a HTML tag.

8. A method according to claim 1, wherein the prioritization is further based on the resource size of content associated with a particular URL in a HTML tag.

9. A method in a proxy node for according to claim 1, wherein the predetermined threshold value is any multiple of 2 between and including 4 and 8, preferably 6.

10. A proxy node comprising one or more processors configured to transfer TCP/IP packets between a server and a client in an IP network, the proxy node being arranged in between the server and the client, wherein the proxy node is adapted for carrying out the method according to claim 1.

11. A non-transitory computer readable storage medium having stored thereon executable instructions that, when executed by one or more processors of a computer system cause the computer system to carry out the method of claim 1.

* * * * *